United States Patent
Tai et al.

(10) Patent No.: US 12,050,192 B2
(45) Date of Patent: Jul. 30, 2024

(54) GAS SENSING DEVICE AND DETECTING SYSTEM

(71) Applicants: National Tsing Hua University, Hsinchu (TW); Taipei Veterans General Hospital, Taipei (TW)

(72) Inventors: Nyan-Hwa Tai, Hsinchu (TW); Chi-Young Lee, Hsinchu (TW); Ching Chang, Hsinchu (TW); Cheng-Chieh Lin, Hsinchu (TW); Tien-Wang Peng, Taipei (TW); Yi-Han Hsiao, Taipei (TW); Kang-Cheng Su, Taipei (TW); Hsin-Kuo Ko, Taipei (TW)

(73) Assignees: NATIONAL TSING HUA UNIVERSITY, Hsinchu (TW); TAIPEI VETERANS GENERAL HOSPITAL, Taipei (TW)

( * ) Notice: Subject to any disclaimer, the term of this patent is extended or adjusted under 35 U.S.C. 154(b) by 669 days.

(21) Appl. No.: 17/197,176

(22) Filed: Mar. 10, 2021

(65) Prior Publication Data

US 2022/0128503 A1 Apr. 28, 2022

(30) Foreign Application Priority Data

Oct. 26, 2020 (TW) ................................. 109137046

(51) Int. Cl.
*G01N 27/12* (2006.01)
(52) U.S. Cl.
CPC .................................. *G01N 27/126* (2013.01)
(58) Field of Classification Search
CPC .. G01N 27/129; G01N 27/227; G01N 27/414; G01N 27/407; G01N 27/4078;
(Continued)

(56) References Cited

U.S. PATENT DOCUMENTS

| 9,291,613 | B2 | 3/2016 | Brant et al. |
| 2005/0150778 | A1* | 7/2005 | Lewis ................. G01N 33/497 |
| | | | 204/403.01 |
| 2007/0048181 | A1 | 3/2007 | Chang et al. |

FOREIGN PATENT DOCUMENTS

| KR | 20160120437 A | * 10/2016 | ............. B65D 85/00 |
| TW | 201207868 A | 2/2012 | |

(Continued)

OTHER PUBLICATIONS

Son et al., "Charge Transfer in Graphene/Polymer Interfaces for CO2 Detection," Nano Research 2018, 11(7): 3529-3536 (Year: 2018).*

(Continued)

*Primary Examiner* — Jill A Warden
*Assistant Examiner* — Michael Stanley Gzybowski
(74) *Attorney, Agent, or Firm* — Crowell & Moring LLP

(57) ABSTRACT

A gas sensing device includes a substrate, a conductive unit, and a sensing layer. The conductive unit is disposed on the substrate, and includes two electrodes. The sensing layer is disposed on the conductive unit, and is electrically connected with the electrodes. The sensing layer adapted to absorb carbon dioxide includes polyethyleneimine and polyethylene glycol. A detecting system including a testing device, an analyzing device and the aforementioned gas sensing device is also disclosed. The gas sensing device is detachably mounted to and is electrically connected to the testing device. Electrical property of the gas sensing device 100 changes when the gas sensing device 100 absorbs carbon dioxide.

19 Claims, 6 Drawing Sheets

(58) Field of Classification Search
CPC ......... G01N 33/497; G01N 2033/4977; G01N 27/126; H01L 28/26
See application file for complete search history.

(56) References Cited

FOREIGN PATENT DOCUMENTS

| TW | I458464 | 11/2014 | |
|---|---|---|---|
| TW | 201721137 | 6/2017 | |
| WO | WO-2020123565 A1 * | 6/2020 | ........... A61B 5/0803 |

OTHER PUBLICATIONS

Search Report appended to an Office Action, which was issued to Taiwanese counterpart Application No. 109137046 by the TIPO on Aug. 25, 2021 with an English translation thereof.

Xu et al., "Preparation and characterization of novel CO2 "molecular basket" adsorbents based on polymer-modified mesoporous molecular sieve MGM-41," Microporous and Mesoporous Materials, 62(1-2), Oct. 22, 2002, pp. 29-45.

Search Report appended to an Office Action, which was issued to Chinese counterpart application No. 202011155607.9 by the CNIPA on May 25, 2023, with an English translation thereof.

* cited by examiner

GAS SENSING DEVICE AND DETECTING SYSTEM

CROSS-REFERENCE TO RELATED APPLICATION

This application claims priority of Taiwanese Invention Patent Application No. 109137046, filed on Oct. 26, 2020.

FIELD

The disclosure relates to a sensing device and a detecting system including the same, and more particularly to a gas sensing device and a detecting system including the gas sensing device.

BACKGROUND

Chronic obstructive pulmonary disease (COPD) is characterized by chronic inflammation of airways, which is mainly caused by air pollutions or tobacco smoking. Long-term exposure to irritants such as smoke, dusts, chemicals, etc. results in airway obstruction, and patients with COPD often have breathing difficulties, and their exhaled breath contain carbon dioxide in a concentration different from that of healthy individuals.

There are several methods used for diagnosing COPD in current clinical practice, for example, collecting blood by radial artery puncture, which might cause more severe pain for patients as compared to venous blood sampling. Another conventional method is using capnography to monitor the concentration or partial pressure of carbon dioxide which needs to be conducted through endotracheal intubation so as to reduce detection error. These conventional methods involves invasive procedures, and might cause discomfort or pain to the patients. In addition, these methods have to be performed by healthcare professionals, which might incur a high diagnosis cost.

SUMMARY

Therefore, an object of the disclosure is to provide a gas sensing device and a detecting system that can alleviate at least one of the drawbacks of the prior art.

According to an aspect of the disclosure, the gas sensing device includes a substrate, a conductive unit, and a sensing layer. The conductive unit is disposed on the substrate, and includes two electrodes. The sensing layer is disposed on the conductive unit, and is electrically connected with the electrodes. The sensing layer includes polyethyleneimine and polyethylene glycol, and is adapted to absorb carbon dioxide.

According to another aspect of the disclosure, the detecting system includes a testing device, the abovementioned gas sensing device, and an analyzing device. The testing device includes a case, an accommodation space formed within the case, a gas inlet formed in the case and spatially communicating with the accommodation space, and an electrical connection seat disposed in the accommodation space. The gas sensing device is detachably mounted to and is electrically connected to the electrical connection seat. Electrical property of the gas sensing device changes when the gas sensing device absorbs carbon dioxide. The analyzing device is electrically connected to the electrical connection seat, and is operable to detect the change of electrical property of the gas sensing device through the electrical connection seat.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
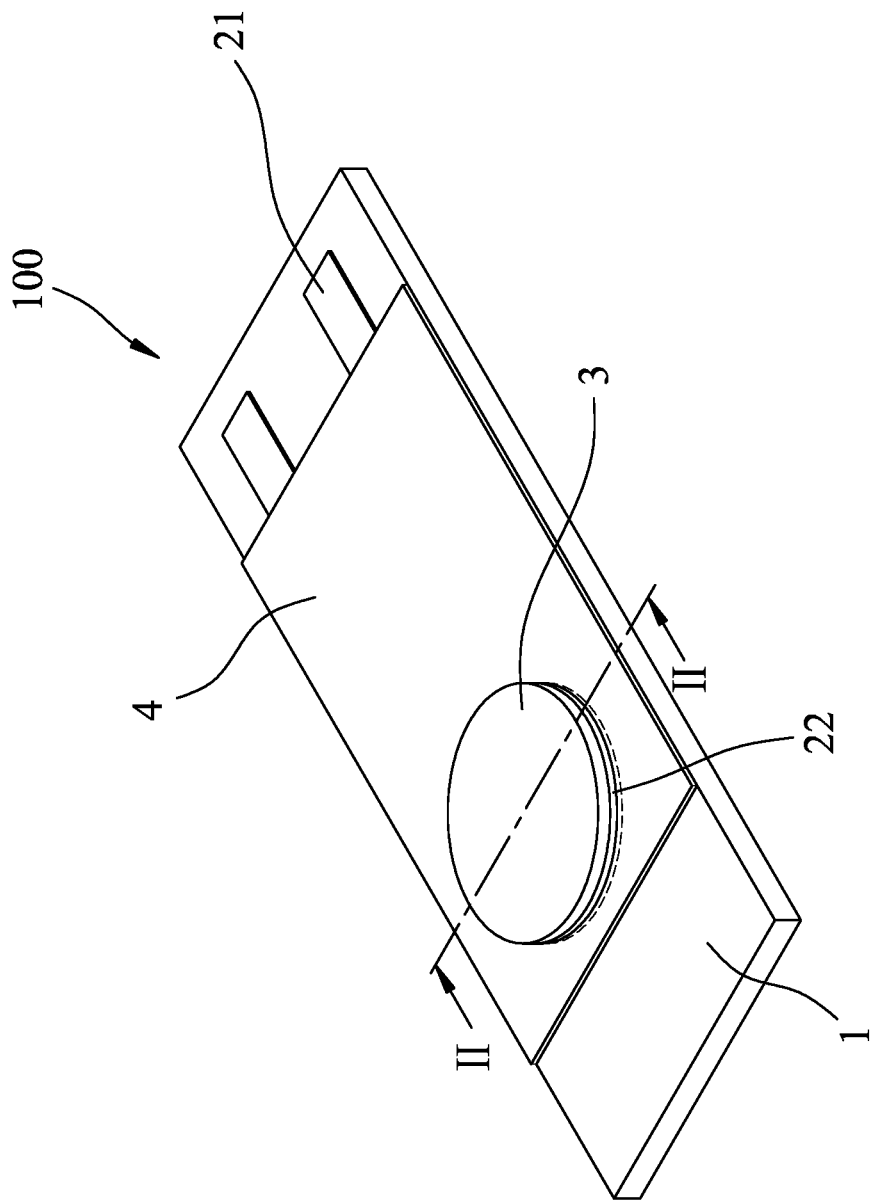
FIG. 1 is a schematic view illustrating an embodiment of a gas sensing device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
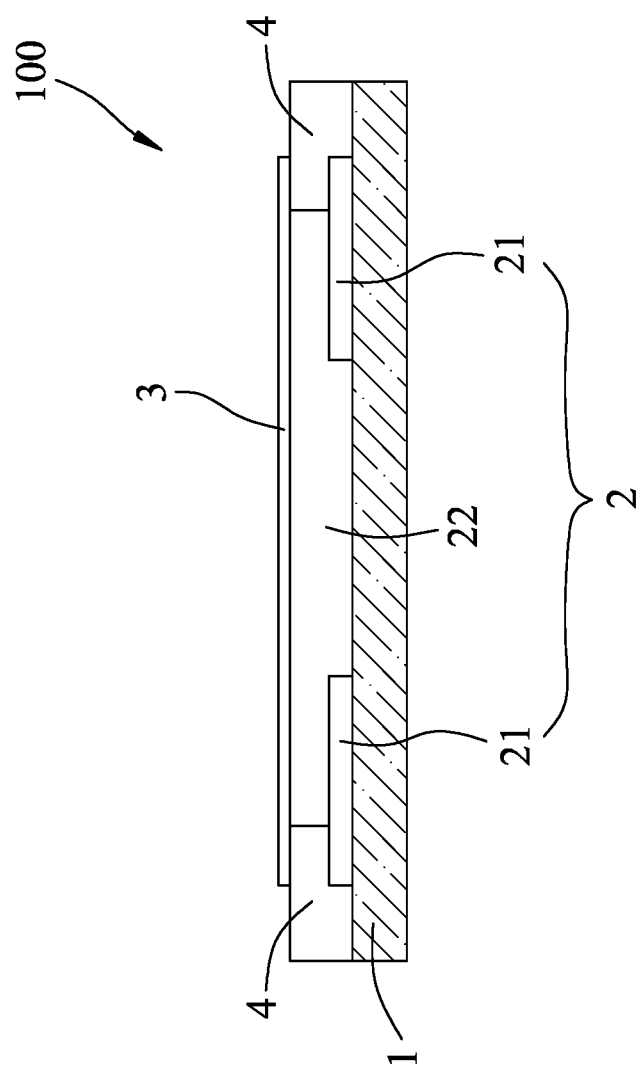
FIG. 2 is a schematic sectional view taken along line II-II of FIG. 1.

Referring to FIGS. 1 and 2, an embodiment of a gas sensing device 100 according to this disclosure includes a substrate 1, a conductive unit 2, and a sensing layer 3.

The substrate 1 is made of an insulating material. Examples of the insulating material may include, but are not limited to, glass, silicon wafer, plastic, and combinations thereof.

The conductive unit 2 is disposed on the substrate 1, and includes two electrodes 21. The electrodes 21 may be carbon electrodes which are formed by a printing process.

In this embodiment, each of the electrodes 21 has a strip shape. The electrodes 21 are spacedly disposed on the substrate 1 and are arranged parallel to each other.

The gas sensing device 100 further includes an insulating layer 4 that is disposed on the electrodes 21 via e.g., an adhesion process or a coating process, in such a manner that an end of each of the electrodes are exposed from the insulating layer 4. The insulating layer 4 is capable of protecting the electrodes 21 from being detached from the substrate 1.

The conductive unit 2 may further include a conductive member 22 that is disposed on and electrically connected to the electrodes 21. In this embodiment, the conductive member 22 is disposed on the exposed end of each of the electrodes 21, and the other end of each of the electrodes 21 opposite to the exposed end is adapted for external electrical connection.

The conductive member 22 may be made of a material selected from the group consisting of conductive polymer, a graphene-based material, carbon nanotube, and combinations thereof. The graphene-based material may be one of graphene and reduced graphene oxide (rGO). In this embodiment, the conductive member 22 is made of carbon nanotube which has a relatively high specific surface area, and is manufactured by evenly distributing the carbon nanotube in isopropyl alcohol which serves a solvent, and then applying the resultant mixture onto the electrodes 21 via e.g., a spraying process, a drop-coating process or a screen-printing process.

The sensing layer 3 is disposed on the conductive unit 2, and is electrically connected with the electrodes 21. In this embodiment, the conductive member 22 is electrically connected to the electrodes and the sensing layer 3. The sensing layer 3 includes polyethyleneimine and polyethylene glycol. A weight ratio of polyethyleneimine to polyethylene glycol may range from 1:0.03 to 1:1. In certain embodiments, the weight ratio of polyethyleneimine to polyethylene glycol is 1:0.1. In this embodiment, the sensing layer 3 is manufactured as follows. The branched polyethyleneimine (in a liquid state at room temperature) and polyethylene glycol are dissolved in isopropyl alcohol, and then the resultant solution is applied to the conductive member 22 via e.g., a spraying process, followed by removal of the isopropyl alcohol, so as to form the sensing layer 3. In addition, the sensing layer 3 may be further subjected to a thermal treatment to remove air bubbles that may be present between the sensing layer and the conductive member 22, so as to improve adherence and electrical conductive path between the sensing layer 3 and the conductive member 22, thereby enhancing the electrical conduction efficiency.

The sensing layer 3 is adapted to absorb carbon dioxide. Specifically, the amine groups of polyethylenimine in the sensing layer 3 are capable of not only capturing carbon dioxide of a gas to be analyzed (i.e., to be contacted with the sensing layer 3), but also absorbing water vapor from the gas according to the following reaction scheme:

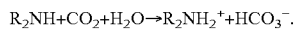

$$R_2NH+CO_2+H_2O \rightarrow R_2NH_2^+ + HCO_3^-.$$

On the other hand, the hydroxyl groups of polyethylene glycol could also capture water vapor in the gas to be analyzed. According to Le Chatelier's principle, when more water vapor is absorbed by the sensing layer 3, the polyethylenimine can absorb carbon dioxide more efficiently, so that the sensitivity of the sensing layer 3 to detect carbon dioxide can be enhanced. That is, by addition of polyethylene glycol to enhance the detection response of polyethylenimine to carbon dioxide, the sensing layer 3 can exhibit an improved detection sensitivity to carbon dioxide.

The polyethyleneimine in the sensing layer 3 may be branched polyethyleneimine, which contains more amine groups than linear polyethyleneimine, so as to efficiently capture carbon dioxide. In certain embodiments, the sensing layer 3 further includes polypyrrole and/or polyaniline, both of which contain amine groups for capturing carbon dioxide in the gas.

Figure 3:
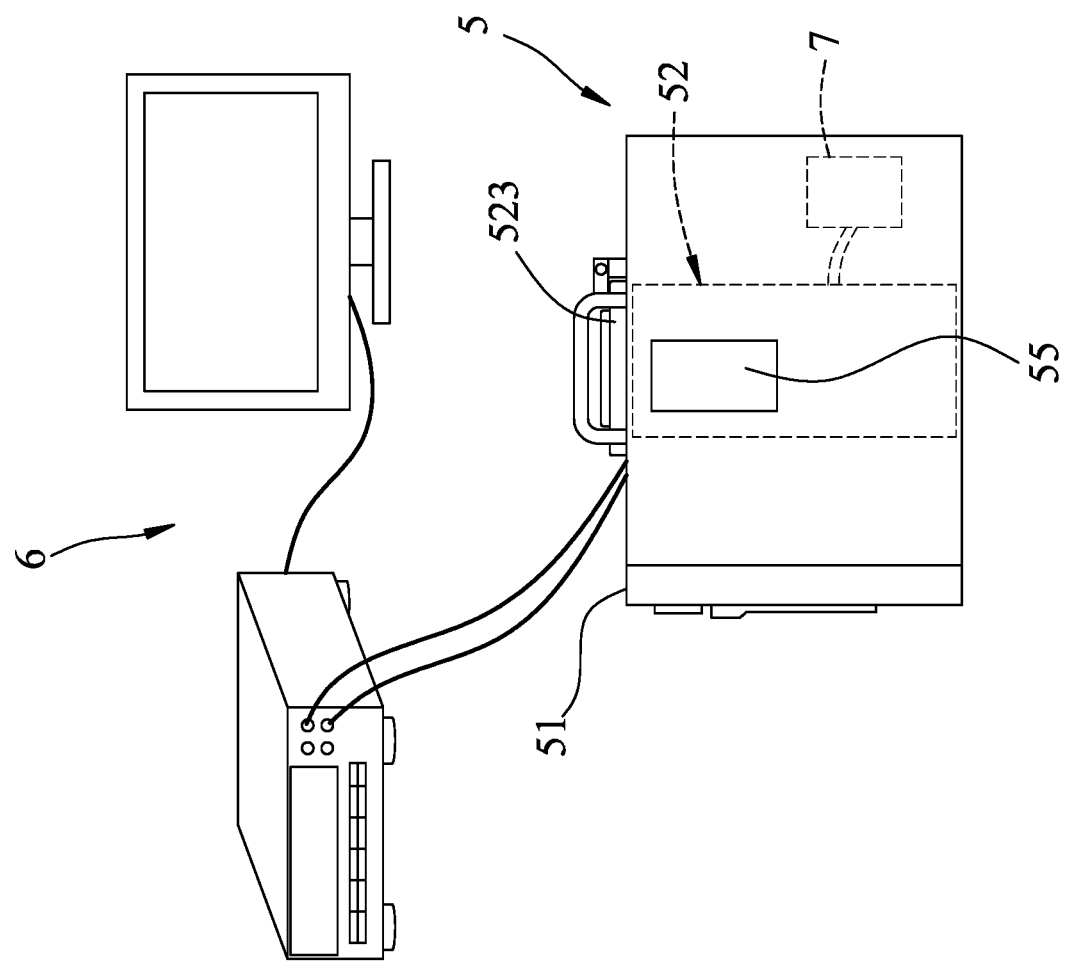
FIG. 3 is a schematic view illustrating an embodiment of a detecting system according to the disclosure.
Figure 4:
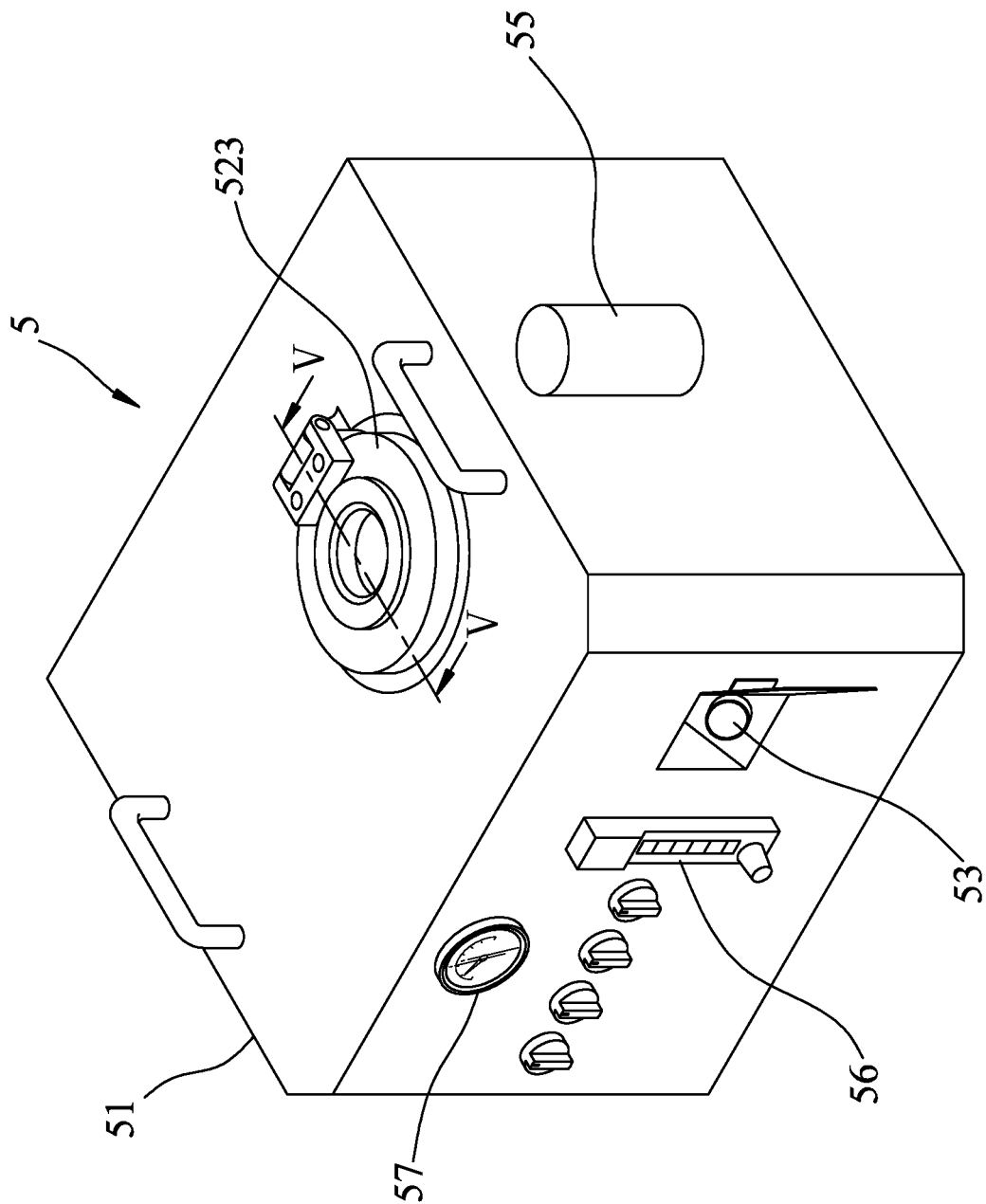
FIG. 4 is a schematic view illustrating a testing device of the embodiment of the detecting system.
Figure 5:
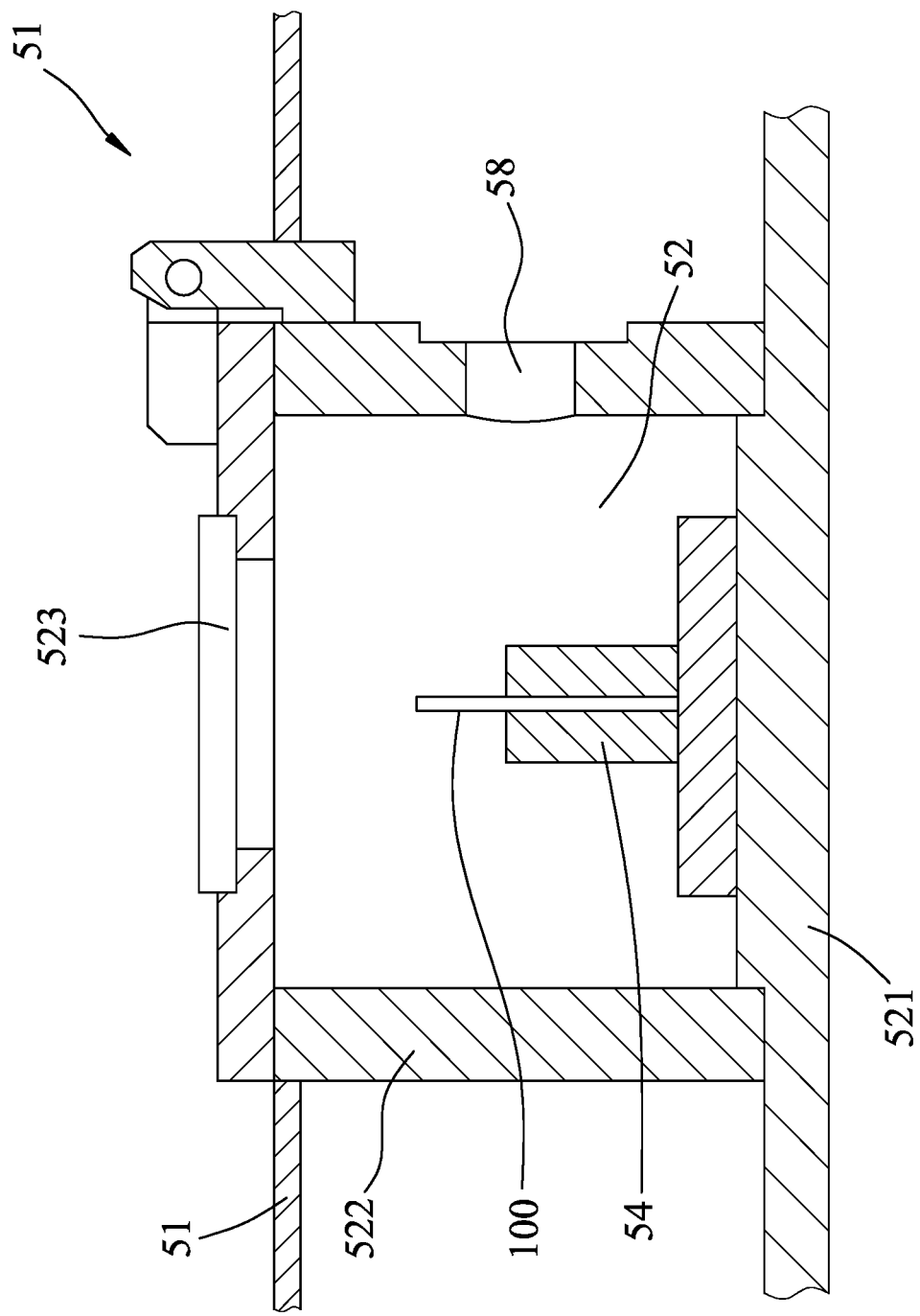
FIG. 5 is a schematic sectional view taken along line V-V of FIG. 4, illustrating an electrical connection seat being disposed in an accommodation space of the testing device, and the gas sensing device being detachably mounted and electrically connected to the electrical connection seat.

Referring to FIGS. 3 to 5, an embodiment of a detecting system according to this disclosure includes a testing device 5, the abovementioned gas sensing device 100, and an analyzing device 6.

The testing device 5 includes a case 51, an accommodation space 52 that is formed within the case 51, a gas inlet 53 that is formed in the case 51 and that spatially communicates with the accommodation space 52, a gas outlet 58 that is formed in the case and that spatially communicates with the accommodation space 52, and an electrical connection seat 54 that is disposed in the accommodation space 52.

The case 51 has a bottom wall 521, a surrounding wall 522 that extends upwardly from the bottom wall 521, and a cover 523 that is disposed on and covers a side of the surrounding wall 522 opposite to the bottom wall 521. The bottom wall 521, the surrounding wall 522 and the cover 523 cooperatively define the accommodation space 52 for receiving the gas sensing device 100.

The gas inlet 53 is operable to allow gas to be introduced into the accommodation space 52, and the gas outlet 58 is operable to exhaust the gas present in the accommodation space 52.

The electrical connection seat 54 is disposed on the bottom wall 521, and is configured for external electrical connection. The electrical connection seat 54 may have a slot for inserting the gas sensing device 100, so that the gas sensing device 100 can conduct external electrical connection via the electrical connection seat 54.

The testing device 5 may further include a filtering member 55 that is disposed on the case 51, and that is operable to filter a gas entering the accommodation space 52.

In addition, the testing device 5 may optionally include a flow meter 56 and/or a pressure gauge 57 according to the practical requirements. The flow meter 56 is formed in the case 51, and is disposed adjacent to the gas inlet 53. The flow meter 56 is operable to measure gas flow of a gas to be analyzed that passes through the gas inlet 53. The pressure gauge 57 is operable to measure the pressure within the accommodation space 52.

The gas sensing device 100 is detachably mounted to and electrically connected to the electrical connection seat 54 through the slot. When the gas sensing device 100 absorbs carbon dioxide, electrical property of the gas sensing device 100 changes.

The analyzing device 6 is electrically connected to the electrical connection seat 54, and is operable to detect the change of electrical property of the gas sensing device 100 through the electrical connection seat 54.

The detecting system further includes a pumping device 7 that is connected to the case 51, and that is operable to pump out a gas from the accommodation space 52.

In use, the exposed ends of the electrodes 21 of the gas sensing device 100 are inserted into the slot of the electrical connection seat 54, and then the surrounding wall 522 is covered by the cover 523 to enclose the accommodation space 52.

After the pumping device 7 is operated to pump out the gas inside the accommodation space 52 until the air pressure inside the accommodation space 52 is reduced to 650 mmHg to 700 mmHg, the filtering member 55 is operated to allow the air outside the case 51 to enter the accommodation space 52 through the filtering member 55 due to the pressure difference between interior and exterior of the case 51, and to allow solid particulate and water vapor to be filtered out of the air. The filtered air is then detected by the gas sensing device 100, and the thus obtained electrical property of the gas sensing device 100 is analyzed using the analyzing device 6, so as to obtain a background signal.

Afterwards, the gas to be analyzed is introduced into the accommodation space 52 through the gas inlet 53, while a portion of the gas is pumped out from the accommodation space 52 through the gas outlet 58, so as to stabilize the air pressure inside the accommodation space 52. When carbon dioxide present in the gas to be analyzed is absorbed by the sensing layer 3, the electrical property (such as resistance) of the gas sensing device 100 changes. Such change of electrical property of the gas sensing device 100 serves as a detection signal that is transmitted through the electrical connection seat 54, and that is then analyzed using the analyzing device 6 by comparing with the background signal, so as to obtain a corresponding concentration of carbon dioxide in the gas to be analyzed.

Specifically, when absorbing or desorbing carbon dioxide, the charge density on the sensing layer 3 changes, which in turn changes the resistance of the sensing layer 3. Since the conductive member 22 made of carbon nanotube has a relatively high specific surface area to form efficient electrical conductive paths, when the electrical property of the sensing layer 3 changes, the conductive member 22 is capable of transmitting the detection signal to the analyzing device 6 in an efficient manner.

Figure 6:
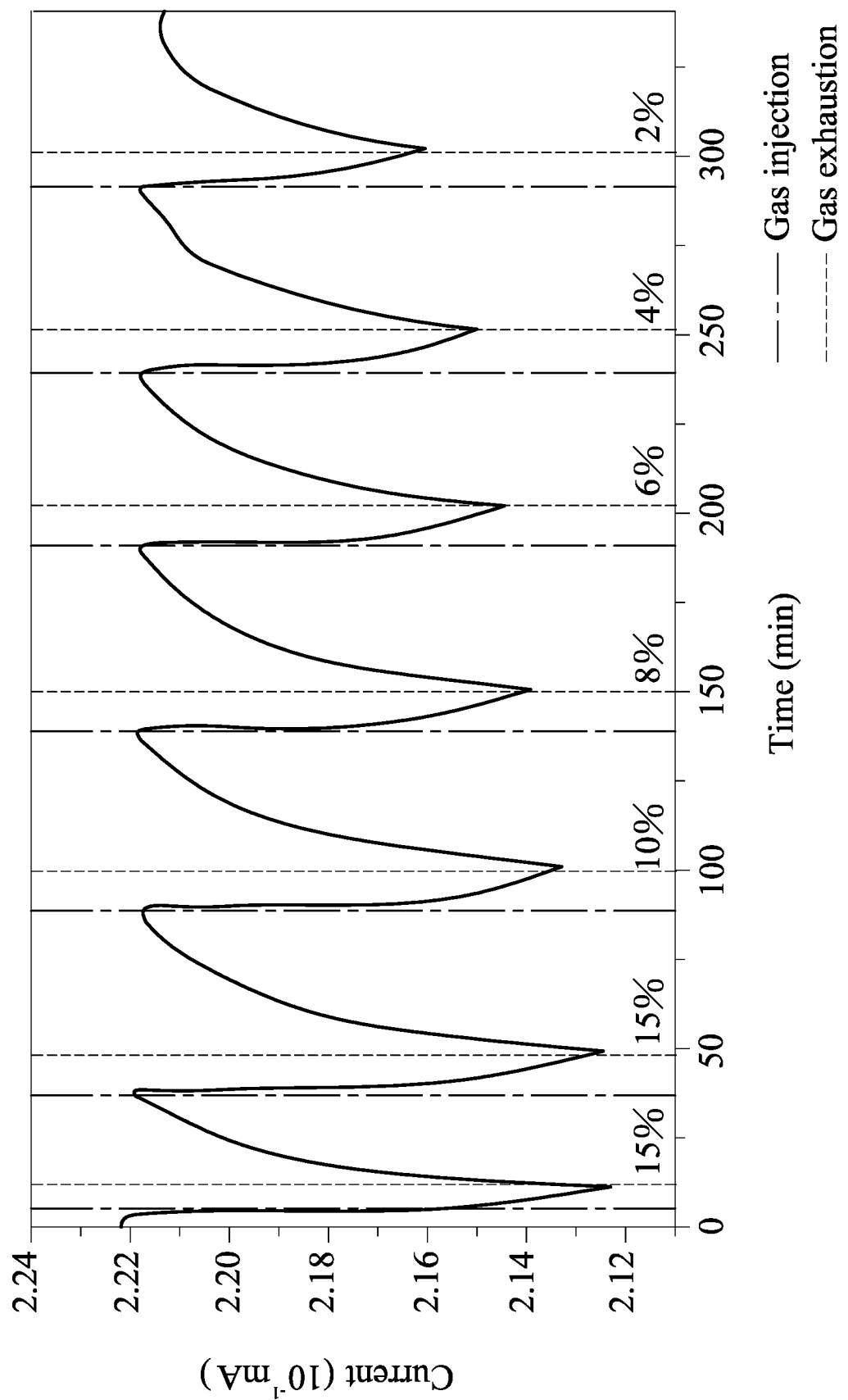
FIG. 6 is a graph illustrating a current curve obtained through detection of test gas samples having different carbon dioxide concentrations using the embodiment of the detecting system.

Referring to FIG. 6, various test gas samples with different carbon dioxide concentrations were detected by the embodiment of the detecting system according to this disclosure, in which the sensing layer 3 of the gas sensing device 100 includes polyethyleneimine and polyethylene glycol in a weight ratio of 1:0.1. Specifically, the gas sensing device 100 is inserted into and is electrically connected to the electrical connection seat 54 which provides a constant external voltage to the gas sensing device 100. Then, seven test gas samples having different carbon dioxide concentrations (i.e., 15 vol %, 15 vol %, 10 vol %, 8 vol %, 6 vol %, 4 vol % and 2 vol %) were sequentially introduced into the accommodation space 52 through the gas inlet 53. Before introducing a next one of the test gas samples, a previous one of the test gas samples would be exhausted from the accommodation space 52. The change in the current of the gas sensing device 100 in response to a respective one of the test gas samples with different carbon dioxide concentrations was recorded and analyzed using the analyzing device 6. As shown in FIG. 6, the test gas samples with different carbon dioxide concentrations cause different levels of changes in currents, indicating that the gas sensing device 100 according to this disclosure exhibits a high sensitivity to carbon dioxide and is capable of providing a stable detection result in a series of continuous examinations.

In sum, by virtue of the sensing layer 3 which includes polyethyleneimine having amine groups for absorbing carbon dioxide and polyethylene glycol having hydroxyl groups for capturing water vapor in the gas to further improve the detection response of polyethylenimine to carbon dioxide, the gas sensing device 100 of this disclosure can exhibit an enhanced detection sensitivity to carbon dioxide. In addition, as compared to conventional invasive methods which are required to be performed by healthcare professionals, the detecting system of this disclosure can easily and effectively detect carbon dioxide in a gas to be analyzed (e.g., gas exhaled from patients with COPD) in an non-invasive manner (i.e., without assistance from healthcare professionals) by directly introducing the gas into the testing device 5 through the gas inlet 53.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A gas sensing device comprising:
    a substrate;
    a conductive unit that is disposed on said substrate and that includes two electrodes; and
    a sensing layer that is disposed on said conductive unit and that is electrically connected with said electrodes, said sensing layer including polyethyleneimine and polyethylene glycol and being adapted to absorb carbon dioxide,
    wherein a weight ratio of polyethyleneimine to polyethylene glycol ranges from 1:0.03 to 1:0.1.

2. The gas sensing device as claimed in claim 1, wherein the polyethyleneimine is branched polyethyleneimine.

3. The gas sensing device as claimed in claim 1, wherein said sensing layer further includes at least one of polypyrrole and polyaniline.

4. The gas sensing device as claimed in claim 1, wherein said electrodes are carbon electrodes.

5. The gas sensing device as claimed in claim 1, further comprising an insulating layer that is disposed on said electrodes in such a manner that an end of each of said electrodes is exposed from said insulating layer.

6. The gas sensing device as claimed in claim 5, wherein said conductive unit further includes a conductive member that is electrically connected to said electrodes and said sensing layer.

7. The gas sensing device as claimed in claim 6, wherein said conductive member is made of a material selected from the group consisting of conductive polymer, a graphene-based material, carbon nanotube, and combinations thereof.

8. The gas sensing device as claimed in claim 7, wherein said conductive member is made of the graphene-based material which is one of graphene and reduced graphene oxide.

9. A detecting system comprising:
    a testing device including a case, an accommodation space that is formed within said case, a gas inlet that is formed in said case and that spatially communicates with said accommodation space, and an electrical connection seat that is disposed in said accommodation space;
    the gas sensing device as claimed in claim 1, said gas sensing device being detachably mounted to and electrically connected to said electrical connection seat, electrical property of said gas sensing device changing when said gas sensing device absorbs carbon dioxide; and
    an analyzing device being electrically connected to said electrical connection seat and being operable to detect the change of electrical property of said gas sensing device through said electrical connection seat.

10. The detecting system as claimed in claim 9, further comprising a pumping device that is connected to said case, and that is operable to pump out a gas from said accommodation space.

11. The detecting system as claimed in claim 9, wherein said testing device further includes a filtering member that is disposed on said case and that is operable to filter a gas entering said accommodation space.

12. The detecting system as claimed in claim 9, wherein the polyethyleneimine in said sensing layer is branched polyethyleneimine.

13. The detecting system as claimed in claim 9, wherein said sensing layer of said gas sensing device further includes at least one of polypyrrole and polyaniline.

14. The detecting system as claimed in claim 9, wherein said electrodes of said gas sensing device are carbon electrodes.

15. The detecting system as claimed in claim 9, wherein said gas sensing device further comprises an insulating layer that is disposed on said electrodes in such a manner that an end of each of said electrodes is exposed from said insulating layer.

16. The detecting system as claimed in claim 15, wherein said conductive unit of said gas sensing device further includes a conductive member that is electrically connected to said electrodes and said sensing layer.

17. The detecting system as claimed in claim 16, wherein said conductive member is made of a material selected from the group consisting of conductive polymer, a graphene-based material, carbon nanotube, and combinations thereof.

18. The detecting system as claimed in claim 17, wherein said conductive member is made of the graphene-based material which is one of graphene and reduced graphene oxide.

19. A gas sensing device comprising:
a substrate;
a conductive unit that is disposed on said substrate and that includes two electrodes; and
a sensing layer that is disposed on said conductive unit and that is electrically connected with said electrodes, said sensing layer including polyethyleneimine and polyethylene glycol and being adapted to absorb carbon dioxide,
wherein a weight ratio of polyethyleneimine to polyethylene glycol ranges from 1:0.03 to 1:0.15.

* * * * *